(12) United States Patent
de los Reyes, III et al.

(10) Patent No.: US 10,130,901 B2
(45) Date of Patent: Nov. 20, 2018

(54) SYSTEMS FOR EMPTYING PIT LATRINES AND SEPTIC TANKS

(71) Applicant: North Carolina State University, Raleigh, NC (US)

(72) Inventors: Francis L. de los Reyes, III, Raleigh, NC (US); Tate W. Rogers, Raleigh, NC (US); Walter J. Beckwith, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 48 days.

(21) Appl. No.: 15/366,547

(22) Filed: Dec. 1, 2016

(65) Prior Publication Data

US 2018/0154285 A1   Jun. 7, 2018

(51) Int. Cl.
*E03F 7/10* (2006.01)
*B01D 21/24* (2006.01)
*B65G 33/16* (2006.01)

(52) U.S. Cl.
CPC ..... *B01D 21/2444* (2013.01); *B01D 21/2477* (2013.01); *B65G 33/16* (2013.01); *E03F 7/10* (2013.01); *E03F 7/106* (2013.01)

(58) Field of Classification Search
CPC ... B01D 21/2461; B01D 21/2477; E03F 7/00; E03F 7/10; E03F 7/106; B65G 33/16; B65G 33/34
USPC ...... 210/241, 523, 524, 532.2; 198/675, 676
See application file for complete search history.

(56) References Cited

U.S. PATENT DOCUMENTS

| 1,437,007 | A | * | 11/1922 | Otterson | E03F 7/10 210/241 |
| 2,596,151 | A | * | 5/1952 | Hudson | E03F 7/10 210/241 |
| 2,638,224 | A | * | 5/1953 | Rupp | B08B 9/0856 210/241 |
| 3,173,663 | A | * | 3/1965 | Schoonover | E04F 21/12 198/676 |
| 3,802,551 | A | * | 4/1974 | Somers | B65G 33/16 198/676 |
| 5,529,170 | A | * | 6/1996 | Schwarz | B01D 21/2461 198/676 |
| 5,676,827 | A | * | 10/1997 | Bruke | B01D 21/2461 210/523 |

(Continued)

FOREIGN PATENT DOCUMENTS

GB   181688   * 4/1922
GB   420800   * 12/1934

*Primary Examiner* — Christopher Upton
(74) *Attorney, Agent, or Firm* — Meunier Carlin & Curfman LLC (57) ABSTRACT

An example system includes an auger assembly that is attachable to a vacuum system, in which the auger assembly includes a hose, an auger, and an auger motor. The hose includes an inlet at a distal end and an outlet at a proximal end. The auger includes a shaftless helical blade having a portion that is radially enveloped by the hose. The vacuum system is adapted to suck material from the septic tank or pit latrine via the hose. The auger motor is adapted to rotate the auger about a helical axis in a first direction, in which the rotation about the helical axis in the first direction causes the shaftless helical blade of the auger to translate along the helical axis from the outlet of the hose towards the inlet of the hose.

17 Claims, 7 Drawing Sheets

(56) References Cited

U.S. PATENT DOCUMENTS

| | | | |
|---|---|---|---|
| 6,096,228 A * | 8/2000 | Angelle | B01D 21/2461 210/524 |
| 6,112,338 A | 9/2000 | Sundberg et al. | |
| 6,790,368 B1 * | 9/2004 | Vachon | E03F 7/10 210/532.2 |
| 8,470,183 B2 * | 6/2013 | DeWaard | B01D 21/2461 210/523 |
| 8,679,335 B1 * | 3/2014 | Dufort | B01D 35/02 210/241 |
| 2009/0077729 A1 | 3/2009 | McLeod et al. | |

* cited by examiner

SYSTEMS FOR EMPTYING PIT LATRINES AND SEPTIC TANKS

TECHNICAL FIELD

This disclosure relates to waste removal systems, and more particularly to auger based pit emptying systems for emptying pit latrines and for excluding trash.

BACKGROUND

Every day, about 1.77 billion people deposit about 0.6 billion kg of feces and about 2.1 billion kg of urine in pit latrines. Unfortunately, non-biodegradable household waste (trash) is also commonly disposed of in pits, resulting in a higher filling rate. Low income countries often lack the financial resources, skills, and political will to implement solid waste management. When there is nowhere to put refuse, pit latrines in low income countries become a convenient receptacle. Numerous types of trash have been reported in latrines including plastic bags, broken glass, cloth, needles, sanitary towels, clothes, newspaper, and anal cleansing materials.

Many mechanical pit emptying technologies are negatively affected by the presence of trash. Trash, such as large pieces of clothing, rope-type materials, bottles, shoes, etc., can clog various tube-based mechanical approaches if the material is bigger than the tube. Often times the size of the tubes are limited to around 10-12 cm in diameter, as larger tubes would not fit the diameter of many squat holes or pedestals of latrines.

Therefore, improved systems for removing fecal sludge from septic tanks and pit latrines are needed that are able to exclude trash during fecal sludge removal.

SUMMARY

Provided are systems for excluding trash during removal of fecal sludge from septic tanks and pit latrines.

An example system includes an auger assembly that is attachable to a vacuum system. The attachable auger assembly includes a hose, an auger, and an auger motor. The hose includes an inlet at a distal end and an outlet at a proximal end. The auger includes a shaftless helical blade having a portion that is radially enveloped by the flexible hose. Once the attachable auger assembly is attached to a vacuum system, the outlet of the hose is in fluid communication with an inlet of the vacuum system. The vacuum system is adapted to suck material from the septic tank or pit latrine via the hose. The auger motor is adapted to rotate the auger about a helical axis in a first direction, in which the rotation about the helical axis in the first direction causes the shaftless helical blade of the auger to translate along the helical axis from the outlet of the hose towards the inlet of the hose.

Another example system is a comprehensive, compact pit and septic tank emptying system that includes a mobile tank, a hose, an auger, an auger motor, and a vacuum system. The hose includes an inlet at a distal end and an outlet at a proximal end, in which the outlet is in fluid communication with the mobile tank. The auger includes a shaftless helical blade having a portion that is radially enveloped by the hose. The vacuum system is mounted under the mobile tank and is adapted to remove material from the septic tank or pit latrine via the hose into the mobile tank. The auger motor may be adapted to rotate the auger about a helical axis in a first direction, in which the rotation about the helical axis in the first direction causes the shaftless helical blade of the auger to translate along the helical axis from the outlet of the hose towards the inlet of the hose.

Also provided are systems for removing fecal sludge from septic tanks or pit latrines. An example system includes an auger assembly that is attachable to a vacuum system. The auger assembly includes a flexible hose and a flexible auger. The flexible auger includes a flexible shaftless helical blade having a portion that is radially enveloped by the flexible hose. The flexible hose includes an inlet at a distal end and an outlet at a proximal end. Once the auger assembly is attached to the vacuum system, the outlet of the flexible hose is in fluid communication with an inlet of the vacuum system. The vacuum system is adapted to suck material from the septic tank or pit latrine via the flexible hose. The auger motor is operatively coupled to the flexible auger and is adapted to rotate the flexible auger about a helical axis of the flexible auger in a second direction. The rotation in the second direction causes the shaftless helical blade of the auger to transport material from the inlet of the flexible hose to the outlet of the flexible hose.

The details of one or more embodiments of the disclosure are set forth in the accompanying drawings and the description below. Other features, objects, and advantages of the disclosure will be apparent from the description, drawings, and from the claims.

DESCRIPTION OF DRAWINGS

To facilitate an understanding of and for the purpose of illustrating the present disclosure, exemplary features and implementations are disclosed in the accompanying drawings, it being understood, however, that the present disclosure is not limited to the precise arrangements and instrumentalities shown, and wherein similar reference characters denote similar elements throughout the several views, and wherein.

DETAILED DESCRIPTION

The following is a description of several illustrations of the subject matter of Applicant's invention. Certain terminology is used herein for convenience only and is not to be taken as a limitation on the present invention. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

The present invention now will be described more fully hereinafter with reference to specific embodiments of the invention. Indeed, the invention can be embodied in many different forms and should not be construed as limited to the embodiments set forth herein; rather, these embodiments are provided so that this disclosure will satisfy applicable legal requirements.

Figure 1:
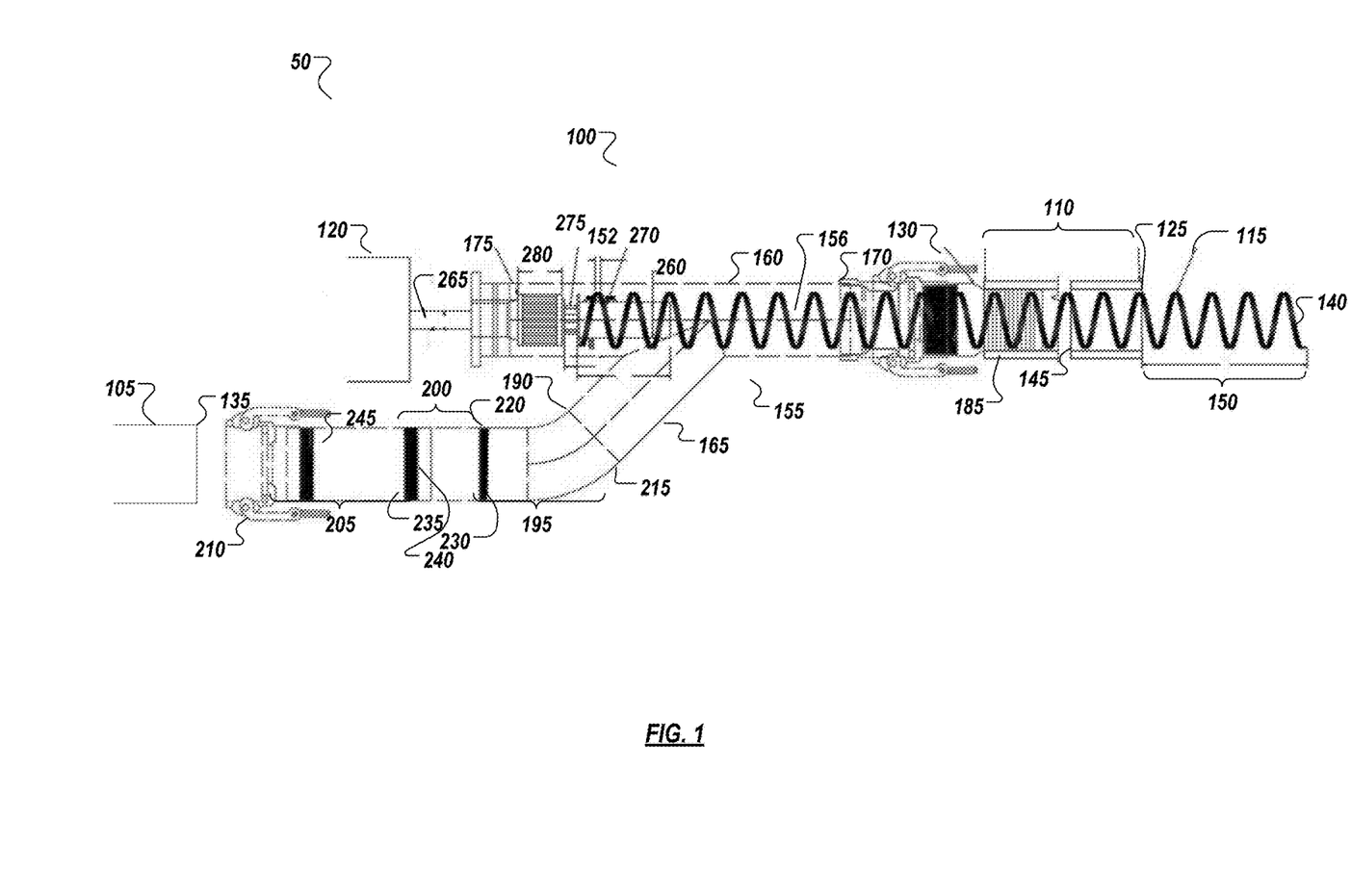
FIG. 1 is a front, broken away view of an example system for excluding trash during removal of fecal sludge from septic tanks and pit latrines in accordance with the present disclosure, the view includes an example embodiment of an attachable auger assembly that includes a hose, an auger, an auger motor, a motor shaft, a pipe assembly, and first, second, and third fittings.
Figure 2:
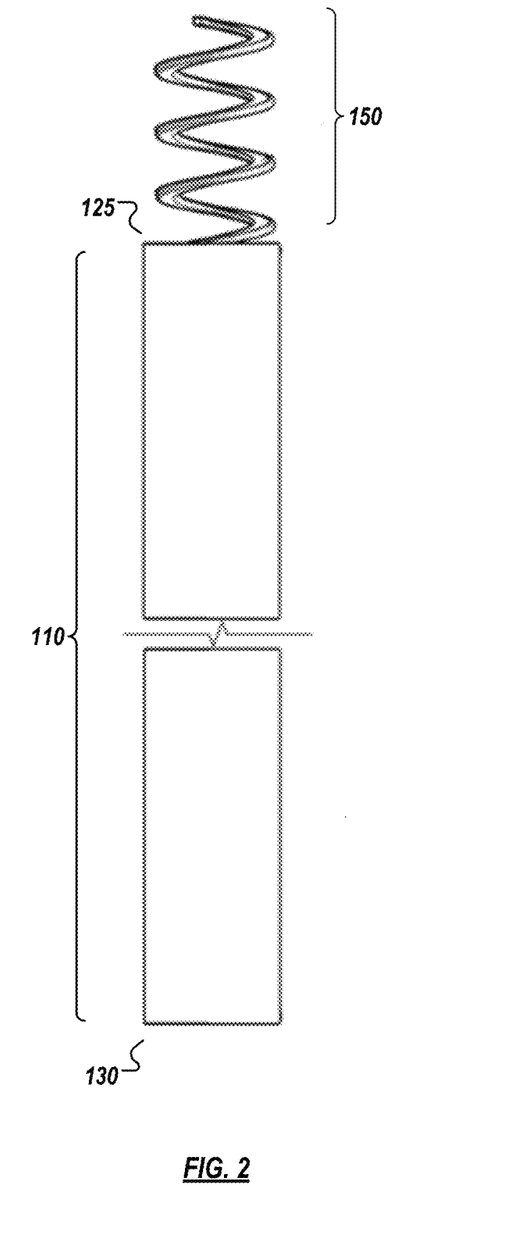
FIG. 2 is an exploded view of the hose and auger of the example system of FIG. 1 in accordance with the present disclosure.
Figure 3:
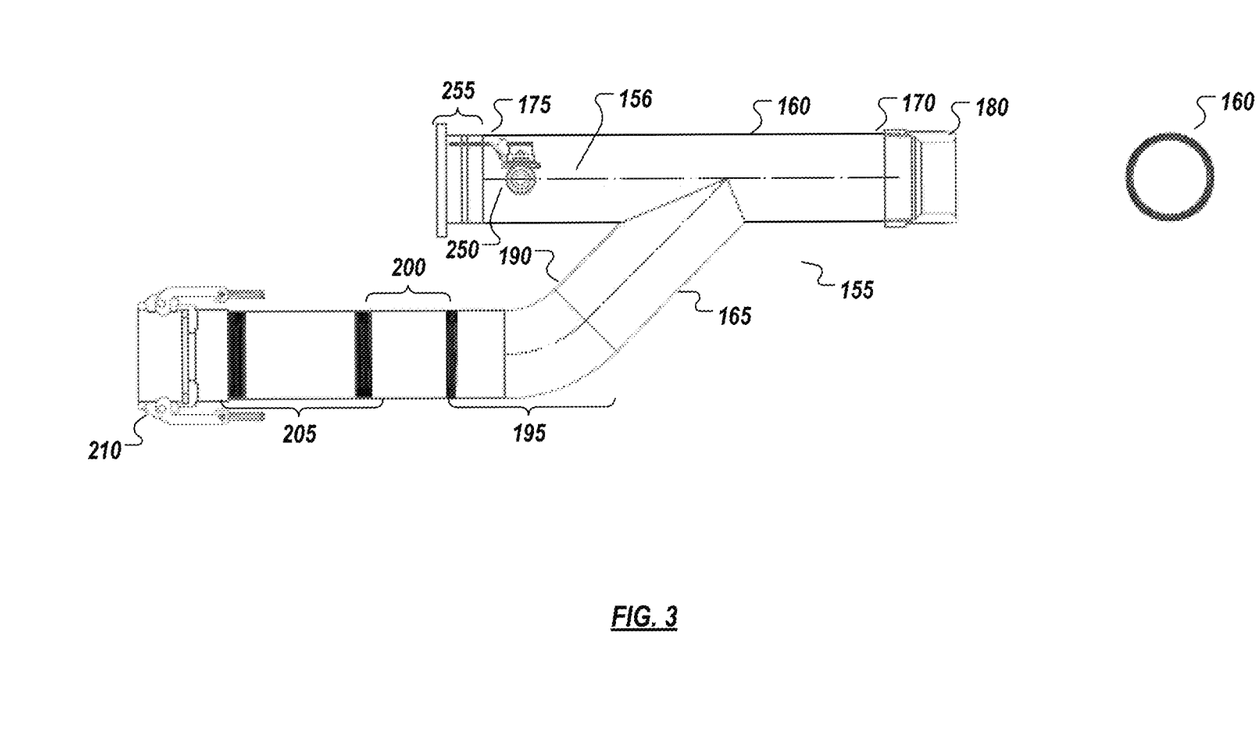
FIG. 3 is front partial view of the example system of FIG. 1, the view includes the pipe assembly, first, second and third fittings, and a cross sectional view of the main pipe of the pipe assembly.

FIGS. 1-3 show a first example system for excluding trash during removal of fecal sludge from septic tanks and pit latrines. As shown in FIG. 1, example system 50 includes an auger assembly 100 that is attachable to a vacuum system 105. An example attachable auger assembly 100 includes a hose 110, an auger 115 comprising a shaftless helical blade, and an auger motor 120. The vacuum system 105 to which the attachable auger assembly 100 is attached to, can be adapted to suck material from the septic tank or pit latrine via the hose 110.

As will be described in detail below, the auger 115 can be used to prevent the hose 110 or the vacuum system 105 from clogging. In some embodiments, the auger 115 can also be used to mix denser materials in pits or latrines until they are fluid enough for vacuum removal. The vacuum system 105 can also be operated to develop pressure when dense sludge is present to aerate and mix the pit or tank before emptying the pit or tank. Suitable vacuum systems can include a variety of components, including, for example, a hose, a vacuum pump, and a vacuum motor. In some embodiments, the vacuum system 105 includes a 1.5 HP 1725 RPM vacuum motor. In some embodiments, the vacuum system 105 includes a pump that can provide a vacuum of about 12-15 inches of mercury.

As shown in FIG. 2, the hose 110 includes an inlet at a distal end 125 and an outlet at a proximal end 130. The outlet 130 of the hose 110 is in fluid communication with an inlet 135 of the vacuum system 105 when the auger assembly 100 is attached to the vacuum system 105. The hose 110, or portions thereof, can be made of polyvinyl chloride (PVC), for example. In some configurations, the length of the hose 110 is at least 15 feet. In some embodiments, the inlet 125 and/or the outlet 130 of the hose 110 have an outer diameter of about 3 inches, for example. In some embodiments, the diameter of the hose 110 varies across the length of the hose 110. In some embodiments, other suitable dimensions for the hose 110 may be used. In some embodiments, the outlet 130 of the hose 110 includes a barbed hose fitting for fitting the inner diameter of the hose 110. Suitable barbed hose fittings may include, for example, easy-fit hose fittings for 3 inch hose inner diameters. Other suitable mechanical or chemical fasteners may be used to secure the hose 110. In some embodiments, the hose 110 is flexible. In some embodiments, the hose 110 is or includes a non-flexible tube member.

In accordance with the present disclosure, the auger 115 includes a shaftless helical blade 140 having a portion 145 that is radial enveloped by the hose 110. The shaftless helical blade 140 can be manufactured from, for example, stainless steel. As shown in FIGS. 1-2, in some embodiments, the auger 115 includes a distal end 150 that protrudes a distance past the hose inlet 125. In some embodiments, the protrusion distance is about 6 inches. In some embodiments, the shaftless helical blade 140 has an outer diameter of about 2.75 inches. In some embodiments, the shaftless helical blade 140 has an inner diameter of about 1.75 inches. In some embodiments, the shaftless helical blade 140 includes a thickness 152 that is about three-sixteenth of an inch.

In some embodiments, the shaftless helical blade 140, the auger 115, and the hose 110 are all flexible. The flexible nature of these components allows system 50 to operate in a compact, physically constrained space such as a rail car sanitary system. Compared to cumbersome truck based systems, the compact nature of system 50 may allow users to easily remove waste from pits and septic tanks that are far from an access road.

As shown in FIG. 1, the auger motor 120 can be operatively coupled to the auger 115. The auger motor 120 can be adapted to rotate the auger 115 about a helical axis 156 in a first direction, in which rotation about the helical axis 156 in the first direction causes the shaftless helical blade 145 of the auger 115 to translate along the helical axis 156 from the outlet 130 of the hose 110 towards the inlet 125 of the hose 110. The translation of the shaftless helical blade 140 from the outlet 130 of the hose 110 towards the inlet 125 of the hose 110 can be used to exclude trash from entering the hose 110 and/or clogging the vacuum system 105. In some embodiments, the auger motor 120 can be further adapted to rotate the auger 115 in a second direction about the helical axis 156, wherein rotation in the second direction causes the shaftless helical blade 140 to transport material, such as fecal sludge, from the inlet 125 of the hose 110 to the outlet 130 of the hose 110. In some embodiments, the auger motor 120 supports only a single mode of rotation, either first direction rotation or second direction rotation is provided. In embodiments where the auger motor 120 supports only second direction rotation, trash is not excluded in the manner described above.

Suitable types of auger motors can include, for example, 1 HP hydraulic or electric motors that provide 435 rotations per minute. The auger motor 120 may be gear reduced in certain embodiments. Other suitable types of motors for directly or indirectly rotating motor shafts may be used.

As shown in FIGS. 1 and 3, in some embodiments, the auger assembly 100 further includes a pipe assembly 155. The pipe assembly 155 includes a main pipe 160 and a take-off pipe 165. The main pipe 160 includes a distal end 170 and a proximal end 175, in which the proximal end 170 is operatively coupled to the auger motor 120. In some embodiments, the main pipe 160 has a top length of about 16.5 inches, an outer diameter of about 3.5 inches, and a wall thickness of about a quarter inch.

The distal end 170 of the main pipe 160 includes an inlet that is coupled to the outlet 125 of the hose 110. In some embodiments, system 50 includes a first fitting 180 that couples the outlet of the flexible hose to the inlet of the main pipe 160. The first fitting 180 can include, for example, a first cam-and-groove hose coupling. The first cam-and-groove hose coupling can be of a standard size, for example, standard size 3. As shown in FIG. 1, in some embodiments, the outlet 130 of the hose 110 includes a barbed hose fitting 185 for fitting the inner diameter of the hose 110 to the inlet 170 of the main pipe 160. Suitable barbed hose fittings may include, for example, easy-fit hose fittings for 3 inch hose inner diameters. In some embodiments, other suitable mechanical or chemical fastening means may be used to selectively or permanently secure the hose 110 to the main pipe 160.

The take-off pipe 165 extends from the main pipe 160 and includes an outlet 190 that is in fluid communication with the inlet 170 of the main pipe 160. The take-off pipe 165 can direct flow of fecal sludge into the inlet 135 of the vacuum system 105. In some embodiments, a center axis of the take-off pipe 165 is at a 45 degree angle in relation to a center axis of the main pipe 160. In some embodiments, the take-off pipe 165 is about 8 inches long.

In some embodiments, system 50 further includes one or more second fittings that couple the outlet of the take-off pipe to the inlet 135 of the vacuuming system 105. As shown in FIGS. 1 and 3, one or more second fittings can include, for example, one or more of the following: an elbow connector 195, a coupler 200, a pipe piece 205, and a second cam-and-groove hose coupling 210. In some embodiments, the one or more second fittings may further or alternatively include other types of suitable fasteners, such as, for example, mechanical or chemical fasteners. The inlet 135 of the vacuum system 105 may comprise a tank or hose located within the vacuum system 105, or may be a tank or hose that is external to the vacuum system 105 in fluid communication with the vacuum system 105 such that fecal sludge may be drawn from the latrine or septic tank into the external hose or tank via negative pressure developed by the vacuum system 105. In some embodiments, the tank is a mobile tank (see FIGS. 4-7).

As shown in FIG. 1, in some embodiments, the elbow connector 195 includes a first end 215 and a second end 220, in which the first end 215 is coupled to the outlet 190 of the take-off pipe 165. In some embodiments, the first end 215 of the elbow connector 195 is unthreaded and the second end 220 is threaded. The first end 215 may be coupled to the outlet 190 of the take-off pipe 165 using a pressure fit, for example. In some embodiments, the coupler 200 includes a threaded first end 230 and a threaded second end 235, in which the threaded first end 230 is coupled to the second end 220 of the elbow connector 195. In some embodiments, the coupler 200 is about 3 inches long. In some embodiments, the pipe piece 205 includes a threaded first end 240 and a threaded second end 245, in which the threaded first end 240 is coupled to the threaded second end 235 of the coupler 200. In some embodiments, the pipe piece 205 is about 7 inches long. In some embodiments, the second cam-and-groove hose coupling 210 is coupled to the second threaded end 245 of the pipe piece 205. The second cam-and-groove hose coupling 210 can be coupled to the inlet of the vacuum system 105. Similar to the first cam-and-grove hose coupling 130, the second cam-and-grove hose coupling 210 can be, in some embodiments, of a standard size such as, for example, standard size 3.

As shown in FIGS. 1 and 3, in some embodiments, system 50 includes one or more third fittings coupled to the proximal end 145 of the main pipe 160. The one or more second fittings can include, for example, an on/off valve 250 and a flange plate 255, in which the on/off valve 250 can be operatively coupled to the vacuum system 105 via, for example, one or more pipes. The on/off valve 250 can be used to release pressure caused by the vacuum system 105.

The on/off valve 250 can include a lever handle to operate the pressure release. In some embodiments, the on/off valve is a one-inch brass ball valve. The flange plate 255 can be coupled to the proximal end 175 of the main pipe 160. The flange plate 255 can have a first side having a height that is designed to fit the dimensions of the proximal end 175 of the main pipe 160. The height can be, for example, 3.5 inches. The flange plate 255 can have a second side having a height that is the same or different from the first height, for example, a height of 4.5 inches.

As shown in FIG. 1, in some embodiments, the auger motor 120 is operatively coupled to the auger 115 via a power takeoff (PTO) shaft 260 and a motor shaft 265, in which the motor shaft 265 is operatively coupled to the PTO shaft 260. The PTO shaft 260 may be coupled to a proximal end 270 of the auger 115, both which can be located within the proximal end 175 of the main pipe 160. In some embodiments, the motor shaft 265 is operatively coupled to the PTO shaft 260 via a PTO short increaser 275 that is coupled to the PTO shaft 260 and a quick coupler 280. The quick coupler 280 couples the PTO short increaser 275 to the motor shaft 265. The quick coupler 280 can comprise, for example, a hydro multi-speed quick coupler. Similar to the PTO shaft 260, the quick coupler can be located within the proximal end 175 of the main pipe 160. As shown in FIG. 1, in some embodiments, the motor shaft 265 is received in a cavity of the quick coupler 280. In some embodiments, the auger 115 is directly coupled to the motor shaft 265. In some embodiments, the motor shaft 265 is directly coupled to the PTO shaft 260. In some embodiments, the motor shaft 265 and the PTO shaft 260 are integrally formed.

FIGS. 4-7 show a second example of a system for excluding trash during removal of fecal sludge from septic tanks and pit latrines.

Figure 4:
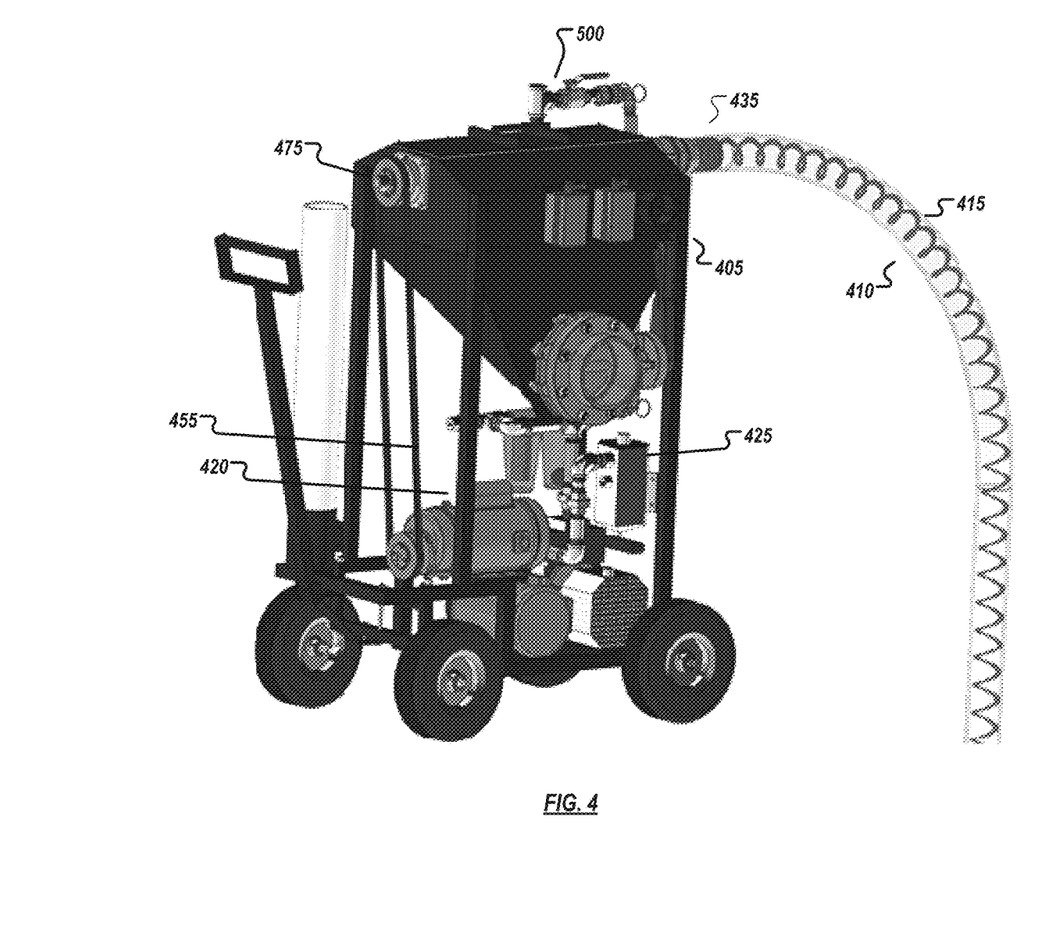
FIG. 4 is an isometric view of another example system for excluding trash during removal of fecal sludge from septic tanks and pit latrines in accordance with the present disclosure.
Figure 5:
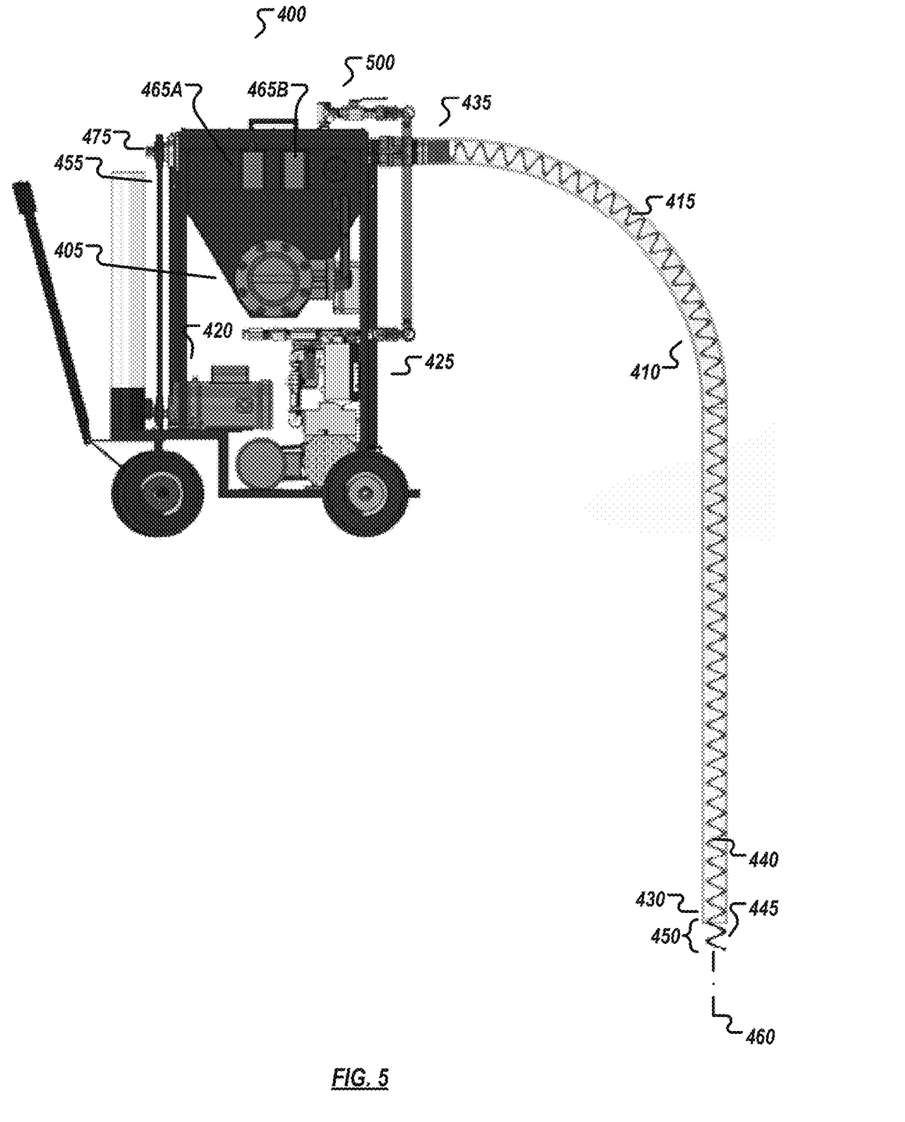
FIG. 5 is a front view of the example system of FIG. 4 in accordance with the present disclosure.
Figure 6:
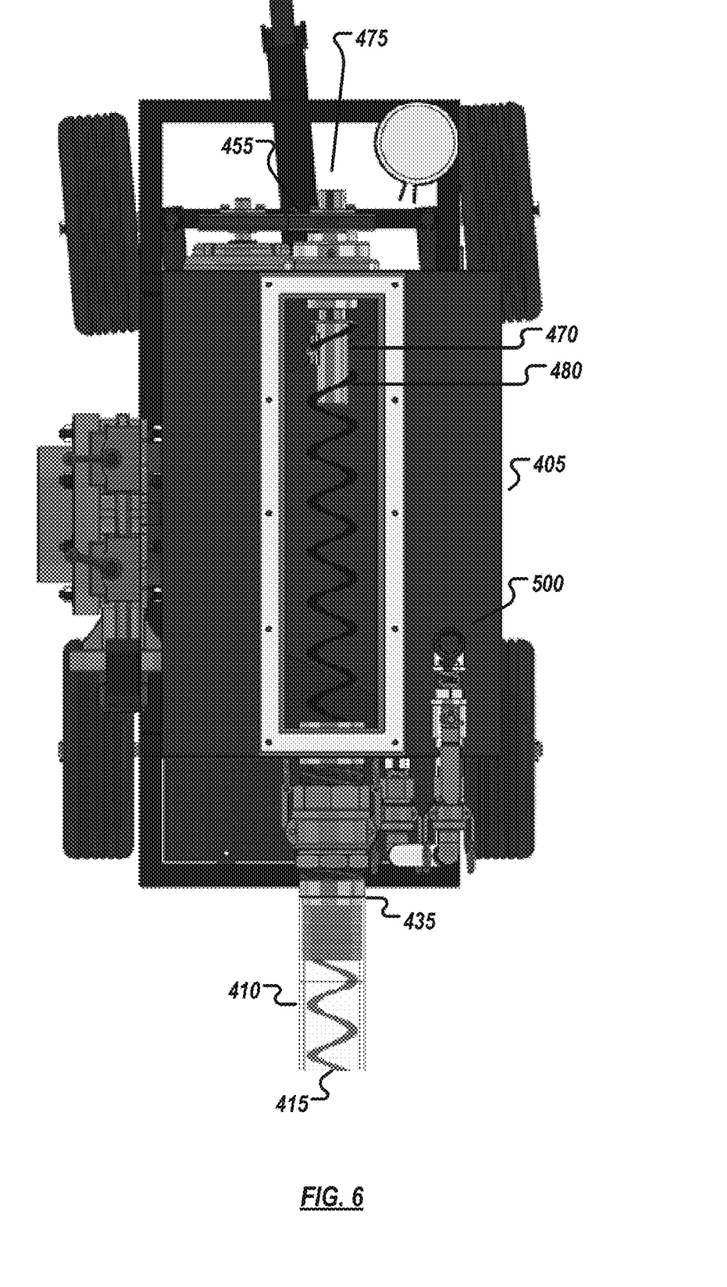
FIG. 6 is a top view of the example system of FIG. 4 with lid removed to show auger and hose connections in accordance with the present disclosure.

As shown in FIGS. 4-6, example system 400 is a compressive, compact pit and septic tank emptying system that includes a mobile tank 405, a hose 410, an auger 415 comprising a shaftless helical blade, an auger motor 420, and a vacuum system 425. The vacuum system 425 is adapted to suck material from the septic tank or pit latrine via the hose 410 into the mobile tank 405. As described in detail below, the auger 415 can be used to prevent the system 400 from clogging. In some embodiments, the auger 415 can also be used to mix denser materials until they are fluid enough for vacuum removal. The vacuum system 425 can also be operated to develop pressure which can be used to aerate and mix pits or tanks that have dense sludge.

As shown in FIG. 5, in some embodiments, the hose 410 includes an inlet 430 at a distal end and an outlet 435 at a proximal end. The outlet 435 of the hose 410 is in fluid communication with the mobile tank 425 such that fecal sludge is collected by the mobile tank 425. The fluid communication may be direct or indirect. For example, the outlet 435 of the hose 410 may be in direct fluid communication with the mobile tank 425 such that fecal sludge enters the mobile tank 425 directly from the hose 410. The outlet 435 of the hose 410 may be in indirect fluid communication with the mobile tank 425 such that the fecal sludge first passes through an intermediate chamber prior to arriving at the mobile tank 425. The intermediate chamber may be, for example, a pipe assembly such as pipe assembly 155 shown in FIGS. 1-2.

As shown in FIGS. 4-5, in some embodiments, the hose 410 is flexible. The hose 410, or portions thereof, can be made of polyvinyl chloride (PVC), for example. In some configurations, the length of the hose 410 is at least 15 feet. In some embodiments, the inlet 430 (see FIG. 5) and/or the outlet 435 of the hose 410 has an outer diameter of about 3 inches, for example. In some embodiments, the diameter of the hose 410 varies across the length of the hose 410. In some embodiments, other suitable dimensions for the hose 410 may be used. In some embodiments, the outlet 435 of the hose 410 includes barbed hose fitting for fitting the inner diameter of the hose 410. Suitable barbed hose fittings may include, for example, easy-fit hose fittings for 3 inch hose inner diameters. Other suitable mechanical fastening means may be used to secure the hose 410. In some embodiments, the hose 410 consists of or comprises a non-flexible tube member. In some embodiments, system 400 includes a hose connection 480 that couples the outlet of the flexible hose to the mobile tank 405. The hose connection 480 can include, for example, a first cam-and-groove hose coupling. The first cam-and-groove hose coupling can be of a standard size, for example, size 3.

Figure 7:
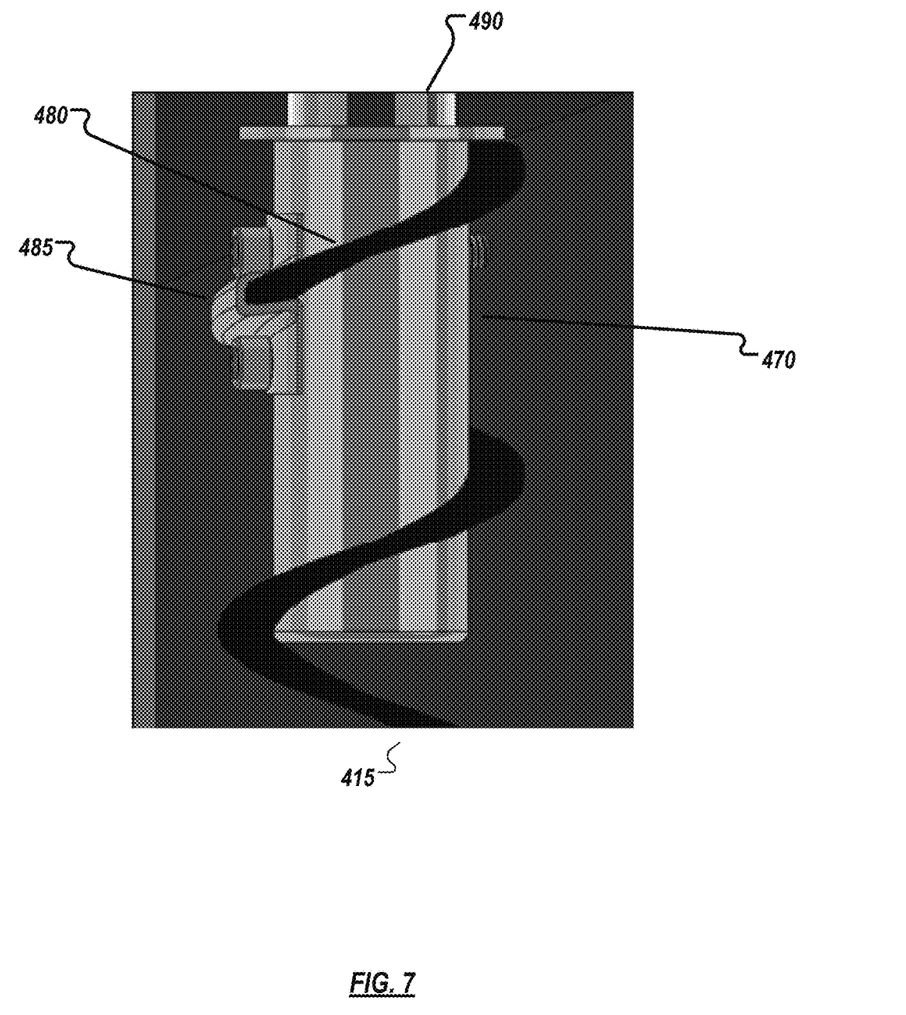
FIG. 7 is an exploded view of the auger connection of FIG. 4 in accordance with the present disclosure.

As shown in FIGS. 4-7, the auger 415 includes a shaftless helical blade 440 having a portion that is radial enveloped by the hose 410. In some embodiments, the shaftless helical blade 440 and auger 415 are both flexible. The shaftless helical blade 440 can be manufactured from, for example, stainless steel. As shown in FIG. 7, in some embodiments, the auger 415 includes a distal end 445 that protrudes a distance 450 past the hose inlet 430. In some embodiments, the protrusion distance 450 is about 6 inches. In some embodiments, the shaftless helical blade 440 has an outer diameter of about 2.75 inches. In some embodiments, the shaftless helical blade 440 has an inner diameter of about 1.75 inches. In some embodiments, the shaftless helical blade 440 includes a thickness that is about three-sixteenth of an inch.

In some embodiments, the shaftless helical blade 440, the auger 415, and the hose 410 are all flexible. The flexible nature of these components allows system 400 to operate in a compact, physically constrained space such as a rail car sanitary system. Compared to cumbersome truck based systems, the compact nature of system 400 may allow users to easily remove waste from pits and septic tanks that are far from an access road.

As shown in FIGS. 4-6, the auger motor 420 of system 400 is operatively coupled to the auger 415. In some embodiments, the auger motor 420 is operatively coupled to the auger 415 via one or more pulleys and/or belts 455. In some embodiments, the auger motor 420 of system 400 is adapted to rotate the auger 415 about a helical axis 460 in a first direction, in which rotation about the helical axis 460 in the first direction causes the shaftless helical blade 440 of the auger 415 to translate along the helical axis 460 from the outlet 435 of the hose 410 towards the inlet 430 of the hose 410. The translation of the shaftless helical blade 440 from the outlet 435 of the hose 410 towards the inlet 430 of the hose 410 to exclude trash from entering the mobile tank 405 and/or clogging the system 400, for example vacuum system 425. In some embodiments, the auger motor 420 is further adapted to rotate the auger 415 in a second direction about the helical axis 460, wherein rotation in the second direction causes the shaftless helical blade 440 to transport material, such as fecal sludge, from the inlet 430 of the hose 410 to the outlet 432 of the hose 410.

As shown in FIGS. 4-6, system 400 can include one or more drum switches 465A, 465B. A first drum switch 465A may be used to control the direction of rotation provided by the auger motor 420 such that the auger motor 420 rotates the auger 415 in the first direction when the first drum switch 465A is set to a first position, and such that the auger motor 420 rotates the auger 415 in the second direction when the first drum switch 465A is set to a second position. A second drum switch 465B may be used to control the operation of the vacuum system 425 such that negative pressure is created within system 400 when the second drum 465B is set to a first position, and such that positive pressure is created within the system 400 when the second drum switch 165B is set to a second position; the pressures being positive and negative in relation to standard atmospheric pressure at sea level.

In some embodiments, the auger motor 420 supports only a single mode of rotation, either first direction rotation or second direction rotation. In embodiments where the auger motor 420 supports only second direction rotation, trash is not excluded in the manner described above.

Suitable types of auger motors can include, for example, 1 HP hydraulic or electric motors that provide 435 rotations per minute. The auger motor 420 may be gear reduced in certain embodiments. Other suitable types of motors for directly or indirectly rotating motor shafts may be used.

As shown in FIGS. 4-7, in some embodiments, the auger motor 420 is operatively coupled to the auger 415 via one or more shafts, for example, via a power takeoff (PTO) shaft 470 and a motor shaft 475 that is operatively coupled to the PTO shaft 470. In some embodiments, the PTO shaft 470 is coupled to a proximal end 480 of the auger 415. As shown in FIGS. 5-6, the proximal end 480 of the auger 415 can be coupled to the proximal end 480 via one or more mechanical fasteners such as, for example, a plate with bolts 485. In some embodiments, the motor shaft 475 is operatively coupled to the PTO shaft 470 via a PTO short increaser 490 that is coupled to the PTO shaft 470 and a quick coupler 495. The quick coupler 495 couples the PTO short increaser 490 to the motor shaft 475. The quick coupler 495 can comprise, for example, a hydro multi-speed quick coupler. In some embodiments, the auger 415 is directly coupled to the motor shaft 475. In some embodiments, the motor shaft 475 is directly coupled to the PTO shaft 470. In some embodiments, the motor shaft 475 and the PTO shaft 470 are integrally formed.

As shown in FIGS. 4-6, the vacuum system 425 of system 400 can include various components, such as for example, a vacuum motor, a vacuum pump, a water trap, a filter, a muffler, and a vacuum/pressure gauge. In some embodiments, the vacuum system 425 is mounted below the mobile tank 405. In some embodiments, the vacuum motor is a 1.5 HP 1725 RPM motor. The vacuum pump may be any suitable pump that can provide at least provide a vacuum of about 12-15 inches of mercury.

As shown in FIGS. 4-6, in some embodiments, system 400 includes an on/off valve 500 that is operatively coupled to the vacuum system 425. The on/off valve 500 can be used to release pressure caused by the vacuum system 425. The on/off valve 500 can include a lever handle to operate the pressure release. In some embodiments, the on/off valve is a one-inch brass ball valve. The on/off valve 500 can be operatively coupled to a vacuum pump or motor of the vacuum system 425 via one or more pipes. In some embodiments, the vacuum system 425 can provide a flow rate of about 190 liters/min of fecal sludge when no trash is present. In some embodiments, the vacuum system 425 can provide a flow rate 114 liters/min of fecal sludge when trash is being excluded.

As shown in FIGS. 4-6, system 400 can further include a variety of other components, such as for example, one or more wheels, one or more handles, a hose holding canister, and a mobile tank outlet valve. In some embodiments, system 400 fits within an area of about 60 cm×125 cm×150 cm.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Disclosed are materials, systems, devices, compositions, and components that can be used for, can be used in conjunction with, can be used in preparation for, or are products of the disclosed methods, systems and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein.

What is claimed is:

1. A system for excluding trash during removal of fecal sludge from a septic tank or pit latrine, the apparatus comprising:
   an auger assembly that is attachable to a vacuum system, the auger assembly comprising:
      a hose having an inlet at a distal end and an outlet at a proximal end, wherein the outlet is in fluid communication with an inlet of the vacuum system when attached, wherein the vacuum system is adapted to suck material from the septic tank or pit latrine via the hose;
      an auger comprising a shaftless helical blade having a portion that is radially enveloped by the hose;
      an auger motor operatively coupled to the auger, in which the motor is adapted to rotate the auger about a helical axis in a first direction, wherein rotation about the helical axis in the first direction causes the shaftless helical blade of the auger to translate along the helical axis from the outlet of the hose towards the inlet of the hose.

2. The system of claim 1, wherein the shaftless helical blade and the hose are both flexible.

3. The system of claim 2, wherein the auger assembly further includes a pipe assembly, the pipe assembly comprising:
   a main pipe having a distal end and a proximal end, wherein the distal end includes an inlet that is coupled to the outlet of the flexible hose, and wherein the proximal end is operatively coupleable to the auger motor; and
   a take-off pipe that extends from the main pipe, wherein the take-off pipe includes an outlet that is in fluid communication with the inlet of the main pipe.

4. The system of claim 3 further comprising a first fitting, wherein the first fitting couples the outlet of the flexible hose to the inlet of the main pipe.

5. The system of claim 4, wherein the first fitting includes a first cam-and-groove hose coupling.

6. The system of claim 3 further comprising a second fitting, wherein the second fitting couples the outlet of the take-off pipe to the inlet of the vacuuming system.

7. The system of claim 6, wherein the second fitting includes:
   an unthreaded elbow connector having a first end and a second end, wherein the first end is coupled to the outlet of the take-off pipe;
   a coupler comprising a first end and a threaded second end, wherein the first end is coupled to the second end of unthreaded elbow connector;
   a pipe piece having a threaded first end and a threaded second end, wherein the threaded first end is coupled to the threaded second end of the coupler; and
   a second cam-and-groove hose coupling that is coupled to the second threaded end of the pipe piece and coupleable to the inlet of the vacuuming system.

8. The system of claim 3, further comprising a third fitting coupled to the proximal end of the main pipe, wherein the third fitting includes an on/off valve with lever handle, wherein the on/off valve is operatively couplabled to the vacuum system.

9. The system of claim 3, wherein the auger motor is operatively coupled to the auger via at least:
   a power takeoff (PTO) shaft coupled to a proximal end of the auger, wherein the PTO shaft is located within the proximal end of the main pipe; and
   a motor shaft operatively coupled to the PTO shaft.

10. The system of claim 9, wherein the motor shaft is operatively coupled to the power takeoff shaft via at least:
    a PTO short increaser coupled to the power takeoff shaft; and
    a hydro multi-speed quick coupler that couples the PTO short increaser to the motor shaft, wherein the PTO short increaser and the hydro multi-speed quick coupler is located within the proximal end of the main pipe.

11. The system of claim 1, wherein the auger includes a distal end that protrudes about 6 inches past the hose inlet.

12. The system of claim 1, wherein the shaftless helical blade has an outer diameter of about 2.75 inches.

13. The system of claim 1, wherein the shaftless helical blade has an inner diameter of about 1.75 inches.

14. The system of claim 1, wherein the flexible hose is at least fifteen feet and comprises polyvinyl chloride (PVC).

15. A system for excluding trash during removal of fecal sludge from a septic tank or pit latrine, the system comprising:
    a mobile tank;
       a hose having an inlet at a distal end and an outlet at a proximal end, wherein the outlet is in fluid communication with an inlet of the mobile tank;
       a vacuum system adapted to remove material from the septic tank or pit latrine via the flexible hose into the mobile tank, wherein the vacuum system is mounted under the mobile tank;
       an auger comprising a shaftless helical blade having a portion that is radially enveloped by the hose; and
       an auger motor operatively coupled to the auger, wherein the motor is adapted to rotate the auger about a helical axis in a first direction, wherein rotation about the helical axis in the first direction causes the shaftless helical blade of the flexible auger to translate along the helical axis from the outlet of the flexible hose towards the inlet of the flexible hose.

16. The system of claim 15, wherein the vacuum system provides a vacuum of about 12-15 inches of mercury, wherein the shaftless helical blade has an outer diameter of about 2.75 inches and an inner diameter of about 1.75 inches, and wherein the hose is at least fifteen feet and comprises polyvinyl chloride (PVC).

17. The system of claim 15, the hose, the auger, and the shiftless helical blade are flexible.

\* \* \* \* \*